United States Patent [19]
Mason et al.
[11] Patent Number: 4,740,799
[45] Date of Patent: Apr. 26, 1988

[54] LIQUID APPLICATOR

[75] Inventors: David J. Mason, Wingate; Brian J. Stanier, Stockton-on-Tees, both of England
[73] Assignee: Imperial Chemical Industries PLC, London, England

[21] Appl. No.: 837,405
[22] Filed: Mar. 7, 1986
[30] Foreign Application Priority Data
Mar. 19, 1985 [GB] United Kingdom ................ 8507006
[51] Int. Cl.[4] ........................ G01D 15/18; B05B 5/00; B05B 5/02
[52] U.S. Cl. ................................ 346/140 A; 346/75; 239/690; 239/706; 361/228
[58] Field of Search ............ 346/140 A, 75; 239/690, 239/706; 361/228

[56] References Cited
U.S. PATENT DOCUMENTS

| | | | |
|---|---|---|---|
| 3,968,498 | 7/1976 | Uchiyama | 346/29 |
| 4,356,528 | 10/1982 | Coffee | 361/226 |
| 4,549,243 | 10/1985 | Owen et al. | 361/228 |
| 4,561,037 | 12/1985 | MacCaine et al. | 361/228 |

*Primary Examiner*—Clifford C. Shaw
*Assistant Examiner*—Gerald E. Preston
*Attorney, Agent, or Firm*—Cushman, Darby & Cushman

[57] ABSTRACT

Electrostatic spraying of a liquid from an applicator on to a substrate. Of primary importance for spraying ink from hand-held devices or in computer graphic work. The spraying is controlled by variation of a control electrode between an operative and an inoperative state; the control electrode, e.g. a needle, being positioned so as to affect the electrostatic field when activated and prevent spraying.

10 Claims, 2 Drawing Sheets

LIQUID APPLICATOR

This invention relates to an applicator for supplying a liquid to a substrate, and in particular to an applicator for uses such as graphic work where it is desired that the region to which the liquid is applied can be precisely controlled. In the applicator of the present invention the liquid is applied as a fine jet, i.e. a stream or spray, created electrostatically.

If an electrical field of suitably high strength is established between a dispensing member, for example a nozzle, to which the liquid is supplied and a ground member spaced from the dispensing member the liquid is drawn away from the dispensing member towards the ground member as one or more fine ligaments of electrically charged liquid. At a certain distance from the dispensing member the ligament or ligaments break up to form a divergent spray of electrically charged droplets. The ligament length depends on the applied field strength and on the electrical and physical characteristics of the liquid, particularly its resistivity, surface tension, and viscosity. For liquids such as normal non-aqueous inks with an applied voltage of the order of 1 to 15 kV, the ligament length is usually no more than 15 mm and is often less than 10 mm.

To obtain a ligament forming field, a large potential difference has to be established between the dispensing member and the ground member. For simplicity and ease of description it will be assumed that the ground member is at earth potential and references hereinafter to "earth" refer to the potential of the ground member and a voltage refers to a potential relative to that of the ground member. It will be appreciated that the ground member need not in fact be at true earth potential and may be at a positive or negative potential relative to true earth. The voltage at the dispensing member may be negative or, preferably, positive relative to the ground member.

Printers utilising this type of ligament formation to transfer the ink from a nozzle to the substrate have been described in UK Patent No. 1444383 and U.S. Pat. No. 3,968,498. In those references the electrical field was generated between a nozzle and a perforate ground member so that the resultant ink stream was projected through the perforate member on to the substrate. The nozzle employed in those references was a small bore tube, typically of internal diameter in the range 0.2 to 0.35 mm. In another form of applicator described in European Patent Publication No. 120633 the liquid is dispensed from a porous wick, for example a felt- or fibre- tip, conveniently of the type employed in conventional felt- or fibre- tip graphic markers.

It is often desirable, for example in applications such as printers, to arrange for rapid switching on and off of the jet. In aforesaid UK Patent No. 1444383 it is proposed to employ a control electrode in the form of a ring disposed around the nozzle: by applying a high voltage to this electrode, the intensity of the field at the nozzle is reduced to below that necessary to cause the liquid to be drawn away from the nozzle so that the jet stops. Then by switching off and on a high voltage on the control electrode, switching on and off of the jet can be achieved. To achieve such control we have found that the high voltage that has to be applied to the control electrode often needs to be substantially above 1 kV. Switching of such high voltages can often cause difficulties. In computer graphic work the pens often travel over the recording medium at several centimeters per second and it is often necessary to switch the pen off and on many times each second. Bearing in mind the high speed of the pen and the intricate and precise nature of much computer graphic work, it is advantageous to have a system that enables accurate switching at rates of 50, 100, 200 times or more per second.

We have devised such a system. In the present invention the electrical field that causes jet formation is reduced, to a level whereat jet formation can not occur, by means of an "earthed electrode" having a small radius of curvature. A corona discharge current is formed between the dispensing member and the earthed electrode, the current being of sufficient magnitude so as to reduce the voltage at the dispensing element below that necessary to cause ligament formation.

Accordingly the present invention provides an applicator for dispesing a liquid comprising (i) a dispensing member having an element of small radius of curvature, (ii) means to supply said liquid to said element, (iii) means to apply a potential difference between said dispensing member and an electrically conductive ground member spaced from said element, (iv) inhibiting means including an electrically conductive, or semi-conductive, control member having a small radius of curvature spaced from said dispensing member, (v) means to vary said inhibiting means between an operative state and an inoperative state, said potential difference between said dispensing member and said ground member being of sufficient magnitude that, when said inhibiting means is in said inoperative state, an electrical field of sufficient strength is provided at said element to draw liquid away from said element as one or more ligaments, and when said inhibiting means is in said operative state, said control member is electrically connected to said ground member and is so spaced from said dispensing member that the distance of said control member from said dispensing member and the electrical resistance between said control member and said ground member are sufficiently small that the electrical field at said element is modified to such an extent that it is insufficient to draw the liquid away from said element.

The element from which the liquid is dispensed is conveniently the end of a small tube, preferably of electrically conductive material, or, as in the aforesaid European Patent Publication No. 120633, the tip of a wick of porous material. The element preferably has a radius of curvature below 5 mm, particularly below 3 mm. The liquid will generally jet from that part of the dispensing member to which liquid is supplied that has the smallest radius of curvature as here the field strength will generally be the greatest.

The control member also has a small radius of curvature, generally below that the element of the dispensing member. Preferably the control member has a radius of curvature below 1 mm and in particular has a radius of curvature below 1 mm in two perpendicular directions. Preferably the minimum radius of curvature is below 0.1 mm. In one preferred form of the invention, the control member has a sharp point: a needle-shaped control member is particularly suitable. Alternatively the cut end of a piece of wire, e.g. of diameter 1 mm or less, can usefully be employed.

In the operative state, i.e. when the control member is inhibiting jet formation, the control member is preferably positioned so that its portion of minimum radius of curvature, hereinafter referred to as its point, is nearest the dispensing member but upstream of the element thereof from which ligament formation occurs. It is preferred that the portions of the dispensing member close to the control member point have sufficiently large minimum radii of curvature that the field between the dispensing member and the control member is insufficient to draw liquid from the dispensing member towards the control member. Alternatively the dispensing member may be arranged such that no liquid is supplied to those portions close to the control member point.

In the operative state the control member is "earthed", either directly or indirectly, i.e. there is a relatively low resistance between the control member and the ground member. The current flowing from the dispensing member to "earth" via the air gap between the dispensing member and the control member will be very small, typically of the order of 5 $\mu$A, often less than 1 $\mu$A. This current is determined by either the load curve of the high voltage generator (output voltage versus output current) or by the resistance (associated with and/or deliberately introduced in to) in the high voltage circuit. At the typical 5 $\mu$A current the control member will be sufficiently earthed if the resistance between the control member point and the ground member is below about $6\times10^8$ ohm ($2\times10^9$ ohm when current is 1 $\mu$A), resulting in the control member point being less than about 3 kV relative to the ground member. Consequently it is not necessary, although preferred, that the control member is a good conductor or that the connection to the ground member is direct: indeed, in one form of the invention as described hereinafter, the "earth" connection to the ground member can be via the body of the operator.

Variation of the state of the inhibiting means can be achieved by making and breaking an "earth" connection or by moving an "earthed" control member in relation to the dispensing member. These methods can be used in combination. By variation of the spacing and/or variation of the resistance to "earth" intermediate the fully operative and fully inoperative states, an analogous control can also be achieved.

In one form of the invention, wherein the applicator is a hand held device, control may be achieved by the operator's finger contacting the control member: when there is no contact the control member is "floating" while, when contacted, it is "earthed" via the operator. Control may also be achieved by the operator's finger varying the spacing of the control member point from the dispensing member. This can give an analogue effect. Also if the control member is made from a relatively poor conductor, variation of the position along its length where contact with the operator's finger is made can provide an analogue control.

In another form of the invention, more applicable to printers, a fixed control member is employed and the "earth" connection is made electronically when desired, e.g. by means of a suitable transistor or other switching element in the line between the control member and the ground member.

Embodiments of the invention are illustrated by reference to the accompanying drawings wherein.

Figure 1:
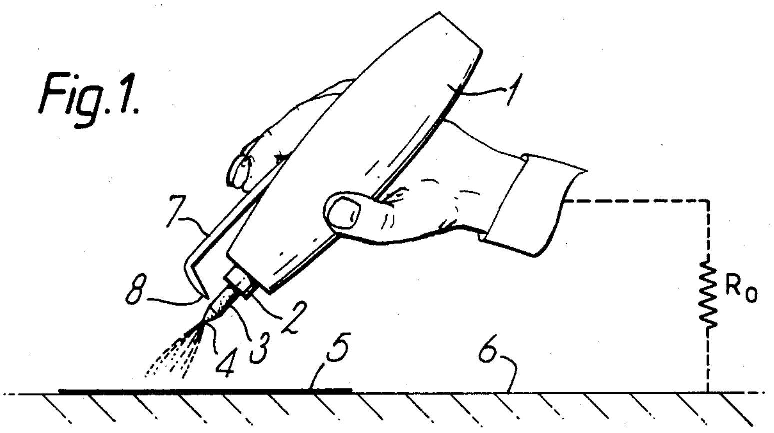
FIG. 1 is a diagrammatic elevation of a hand held applicator.

In the embodiment of FIG. 1 the applicator is of the type described in European Patent Publication No. 1260633 and has a hand-held casing 1 in which is mounted a graphic marker 2 having a fibre wick 3 terminating in a rounded tip 4. Within casing 1 is a high voltage generator (not shown) powered by batteries (not shown) also located within the casing. The high voltage is applied from the generator to a stud (not shown) through the graphic marker casing so that the high voltage is applied to the fibre wick 3 via conduction through the ink in the graphic marker. The applicator is used to dispense ink as a spray from the tip 4 of the fibre wick 3 on to a sheet of paper 5 resting on a surface 6.

The return electrical connection, represented by the dotted line and resistor $R_o$, from the surface 6 to the generator is made via conduction through the operator.

Attached to the casing 1 is an inhibiting member 7 made of a conductive plastics material having a pointed end 8, constituting the control member, disposed spaced from the fibre wick 3 at a location away from the tip 4 of wick 3. When it is desired to stop spraying, the operator contacts the inhibiting member 7 with his or her finger thereby "earthing" the control member 8 with respect to surface 6 via the operator's body.

By making inhibiting member 7 somewhat flexible, analogue control of the spray can be achieved by the operator's finger pressing the control member 8 closer to wick 3.

Typically with a generator output voltage of 4 to 7 kV applied to a wick 3 of diameter approx. 3 mm having a hemispherical tip 4, cessation of spraying will be achieved when the operator's finger contacts the inhibiting member 7 with the point 8 spaced about 5 mm from the cylindrical surface of wick 3 at a location about 5 mm from the apex of tip 4.

Figure 2:
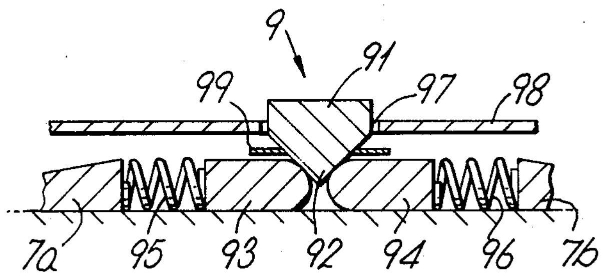
FIG. 2 is a modification of a detail of the applicator of FIG. 1.

In a modification of this embodiment, the detail of which is shown in FIG. 2, there is a switch 9 positioned in inhibiting member 7, said switch operable by an operator's finger. A button 91 has a wedge portion 92 that, when said switch is in the open position (as depicted) spaces apart contacts 93, 94 of the switch. These contacts are respectively mounted on compression springs 95, 96 on parts *7a*, *7b* of inhibiting member 7. The contacts 93, 94 are speced about 5 mm apart to avoid arcing and tracking when no connection is desired. The button 91 protrudes through an aperture 97 in panel member 98, said panel member 98 being spaced from, and protecting, the contacts 93, 94 and springs 95, 96. In use the button 91 is depressed by an operator's finger (not shown) to space the contacts 93, 94 apart and thereby there is no connection of parts *7a* and *7b* of the inhibiting member 7. Thus the control member 8 of the inhibiting member 7 adjacent the wick 4 is in an inoperative state. When the operator's finger is lifted from button 91 the springs 95, 96 urge contacts 93, 94 together so as to provide electrical connection between *7a* and *7b* rendering the control member 8 of the inhibiting member 7 in an operative state. The button 91 is urged in an upward direction through the aperture 97 in panel member 98, but is prevented from passing completely therethrough by annular lug 99 which registers with the underneath of panel member 98. In this embodiment the spacing apart of the contacts provides a degree of analogue control of the current and therefore control of the spray rate from the applicator.

It has been stated hereinabove that the point 8 is spaced about 5 mm from the cylindrical surface of wick 3. This spacing prevents a perceptible current being passed through the operator to earth when the operator's finger makes contact with the inhibiting member 7. When a switch 9 is used it is preferably to mount the point 8 of the inhibiting member 7 closer to the tip, typically about 3 mm.

Figure 3:
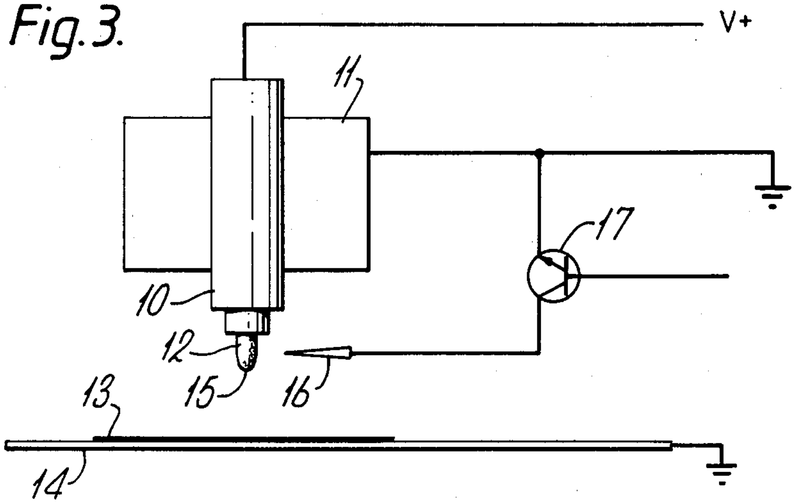
FIG. 3 is a diagrammatic elevation of an applicator arrangement for a printer.

In the embodiment of FIG. 3, a fibre-tip graphic marker 10 having a metal casing is mounted on, but insulated from, an "earthed" carriage 11 whose movement is controlled in known fashion by signals from a control unit (not shown). A high voltage, relative to earth, is applied from a generator (not shown) to the casing of marker 10. If a plastic pen is used the performance is greatly improved by increasing the capacitance thereof, for example by inserting a metal sleeve into the pen.

The substrate 13, e.g. paper, on which it is desired to print, is supported by an earthed plate 14 above 5 mm below the end of the marker tip 15. In this embodiment the inhibition means comprises a metal control member 16 positioned about 5 mm from the wick 12 at a location about 5 mm from the apex of the tip 15. The needle 16 is connected to the earthed carriage 11 via a transistor switch 17 to whose base signals are fed from the control unit to cause transistor switch 17 to conduct, thus earthing needle 16, when no jet is required.

Such an embodiment is of particular utility in printing. The movement of the carriage 11 is controlled by signals from a control unit. The control unit may be a measuring instrument producing an output signal indicative of the parameter being measured or may be a more complex unit such as a computer, by which term we include related hardware such as micro-processors. The embodiment is of particular utility as a printer for portraying computer graphics.

The signal or signals from the control unit include signals to determine the co-ordinates at which it is desired to effect the mark from the applicator. The means effecting the relative movement of the applicator relative to the substrate may include a suitable arm, carrying the applicator, driven by a motor or motors which may be electrically, pneumatically, or hydraulically powered. In some cases the substrate may be moved in one direction, e.g. continuously, or intermittently, as in a conventional linear or disc chart recorder or a line printer, while the applicator is moved, under the control of the control unit, in a direction transverse to the direction of substrate movement.

Alternatively the substrate may be stationary and the applicator moved to the appropriate position thereover.

Means may also be provided for effecting relative movement in the third dimension, i.e. to vary the distance of the tip of the wick from the substrate in response to signals from the control unit.

Figure 4:
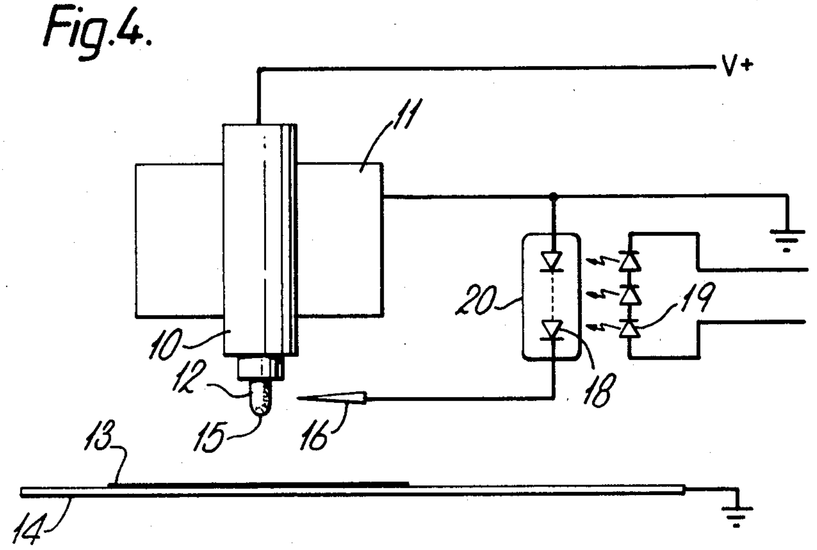
FIGS. 4 and 5 are diagrammatic elevations of modifications of the printer of FIG. 3.

A modification of the applicator of FIG. 3 is shown in FIG. 4. This modification relates to the switch 17 wherein the transistor of FIG. 3 is replaced by a rectifier stack diode 18. The rectifier stack diode 18 is connected between the metal control member 16 and earth, the polarity of the diode connections being such that only a very low reverse thermal leakage current will normally flow through it. When the rectifier stack diode 18 is bombarded by infra-red light from infra-red light emitting diodes (LED's) 19, activated by a standard control circuit (not shown), minority carriers are formed in the diode 18 allowing charge to be conducted to earth. The number of minority carriers formed, and hence the amount of charge which may be conducted to earth, is increased by increasing the intensity of the infra-red light falling on the diode 18. Hence analogue control is obtained by varying the current to the infrared LED's 19 and/or varying the light falling on the diode 18 by altering the spacing and/or orientation of the LED's 19 relative to the diode 18, and/or supplying the signal to the LED's 19 in the form of a pulse train, the mark to space ratio of which can be varied.

The rectifier stack diode 18 is in fact a number of individual semiconductor junctions, this number is variable, for example we use those typically used for television E.H.T. rectification. The number of LED's 19 is also variable, typically we use 3 LED's per rectifier stack diode.

It should be noted that infra-red light is used as the rectifier stack diode 18 is packaged within a material 20 that is opaque to visible light. Alternative devices using different packaging may be employed utilising different parts of the electromagnetic spectrum, for example torch light bulbs can activate a rectifier stack diode packaged within glass or certain opaque material (via the infra-red component.

Figure 5:
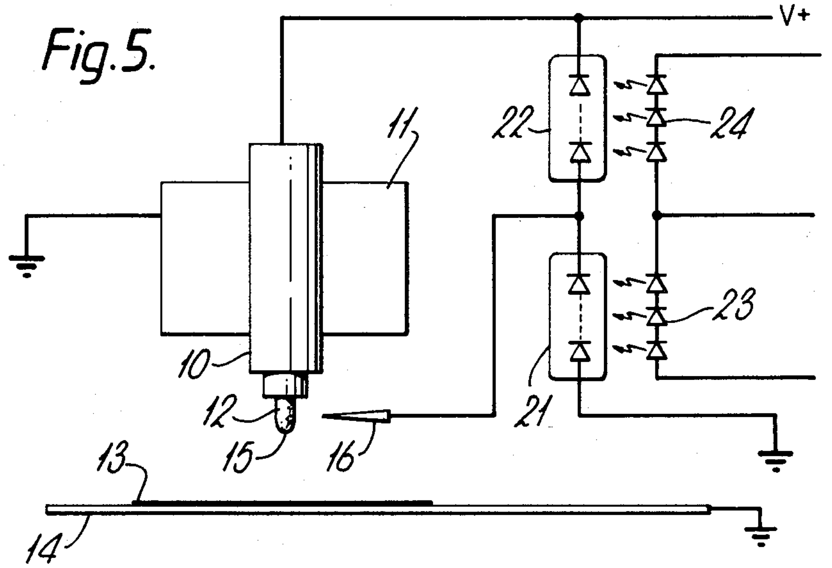

A further modification of the applicator of FIG. 3 is shown in FIG. 5. The transistor 17 of FIG. 3 is replaced by two rectifier stack diodes. A first rectifier stack diode 21 is connected between the metal control member 16 and earth (as in FIG. 4) and a second rectifier stack diode 22 is connected between the metal control member 16 and the high voltage source (not shown) supplied to the marker 10. Each rectifier stack diode is connected with such polarity that only thermal leakage current will normally flow in either diode. Each rectifier stack diode operates as described in relation to FIG. 4. In use, when no spray is required, rectifier stack diode 21 is illuminated with infra-red light from LED's 23 activated by a standard control circuit (not shown); diode 22 not being illuminated due to an optical shield. Charge is carried to earth from the control member 16 so corona discharge current occurs between wick 12 and member 16, lowering voltage at the tip 15 and preventing spraying on to the substrate 13. When a spray is required, LED's 23 are switched off and rectifier stack diode 22 is illuminated with infra-red light from LED's 24 activated by a standard control circuit (not shown). The control member 16 is thus connected to the high voltage source and is at about the same potential as the wick 12. Preferably to achieve spraying a pulse train signal is used for control of the rectifier stack diodes 21, 22. This pulse train signal is fed to LED's 23 and is of sufficiently high frequency that the spray is not switched on and off by individual pulses; this is determined by the capacitance of the high voltage circuit, typically 5 KHz and above is satisfactory. An inverted version of this pulse train signal is fed to the LED's 24 thus illuminating the diode 22 connecting the control member 16 to the high voltage source, the feed being such that only one of diodes 21, 22 is illuminated at any particular instant. In this way rapid switching of the spray is achieved (for example up to 1 KHz and above) and good analogue control of the spray results from variation of the mark to space ratio of the pulse train signal.

It will be appreciated that variable D.C. signals can be used instead of a pulse train signal to the LED's 23,

24. In addition methods which reduce the intensity of light falling on the diodes 21, 22 by shadowing, moving mirrors or variable spacing and/or orientation can be used.

In the embodiment of FIG. 5, either one, but not both, of the rectifier stack diodes 21, 22 can be replaced by a resistor which can be fixed at an appropriate resistance value or can be varied in a controlled manner as desired.

We claim:

1. An applicator for dispensing a liquid, which comprises:

(i) a dispensing member having an element of small radius of curvature, (ii) means to supply said liquid to said element, (iii) an electrically conductive ground member spaced from said element, (iv) means for applying a potential difference between said dispensing member and said ground member to provide an electrical field of sufficient strength at said element to draw liquid away from said element, (v) inhibiting means including an electrically conductive, or semi-conductive control member having a small radius of curvature spaced from said dispensing member, and (vi) connecting means to electrically connect said control member to said ground member, said connecting means being variable between a low resistance and a high resistance to vary said inhibiting means between an operative state and an inoperative state respectively, wherein the radius of curvature of the element, the distance between the dispensing member and the control member, and the resistance of the connecting means in said operative state, are sufficiently small to modify said electrical field to produce between said dispensing member and said control member, a corona discharge of sufficient magnitude to inhibit withdrawal of liquid away from said element.

2. An applicator according to claim 1 wherein the control member is spaced at a fixed position from the dispensing member.

3. An applicator according to claim 2 wherein the electrical connection of the control member with the ground member is electronically switchable to cause the inhibiting means to change between operative and inoperable states.

4. An applicator according to claim 3 wherein the electrical connection comprises a rectifier stack diode connected between the control member and earth, the polarity being such that only thermal leakage current would normally flow, and activating means for said diode, whereby when said activating means are operating the rectifier stack diode passes current from the control member to earth thus lowering potential difference at the dispensing member element so that the electrical field at said element is insufficient to draw liquid away from said element.

5. An applicator according to claim 4 wherein the activating means comprises at least one light emitting diode.

6. An applicator according to claim 1 wherein the electrical connection comprises (i) a first rectifier stack diode connected between the control member and earth and first activating means for activating said first diode, (ii) a second rectifier stack diode connected between the control member and the means for applying a potential difference and second activating means for activating said second diode, each said diode connected with a polarity such that only thermal leakage current would normally flow, whereby when said first activating means operate to activate said first diode, current passes from the control member to earth thus lowering potential difference at the element of the dispensing member so that the electrical field at said element is insufficient to draw liquid away from said element, and whereby when said second activating means operate to activate said second diode, said control member is connected to the means for applying a potential difference and is at substantially the same potential as said element, so that the electrical field at said element is sufficient to draw liquid away from said element; said first and second activating means not operating simultaneously.

7. An applicator as claimed in claim 6 wherein said first and second activating means are light emitting diodes, which comprises means for feeding a high frequency pulse train signal to said first light emitting diode, means for feeding an inverted version of said signal to said second light emitting diode.

8. An applicator according to claim 1 for hand-held use wherein said control member is electrical connected to said ground member via a hand of an operator.

9. An applicator according to claim 1 for printing on a sheet-like substrate, which further comprises means for effecting relative movement between said applicator and said substrate in a plane perpendicular to said substrate in response to a signal or signals from a control unit.

10. A process for controlling the dispensing of liquid from an applicator as described in claim 1 which comprises (i) supplying liquid to said element of small radius of curvature, (ii) applying a potential difference between said dispensing member and electrically conductive ground member, (iii) when it is desired to inhibit dispensing, activating said inhibiting means by electrically connecting said control member to said ground member so that the electrical field at said element is modified so that it is insufficient to draw liquid away from said element, and (iv) when it is desired to dispense liquid, deactivating said inhibiting means so that the potential difference between said dispensing member and said ground member is sufficient to draw liquid away from said element.

* * * * *